US010652027B2

United States Patent
Angus et al.

(10) Patent No.: US 10,652,027 B2
(45) Date of Patent: May 12, 2020

(54) AIRPLANE IDENTITY MANAGEMENT WITH REDUNDANT LINE REPLACEABLE UNITS (LRUS) AND COMPOSITE AIRPLANE MODIFIABLE INFORMATION (AMI)

(71) Applicant: The Boeing Company, Chicago, IL (US)

(72) Inventors: Ian G. Angus, Mercer Island, WA (US); Travis S. Reid, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 306 days.

(21) Appl. No.: 14/887,969

(22) Filed: Oct. 20, 2015

(65) Prior Publication Data

US 2017/0111176 A1 Apr. 20, 2017

(51) Int. Cl.
*H04L 9/32* (2006.01)
*H04L 29/06* (2006.01)

(52) U.S. Cl.
CPC .......... *H04L 9/3263* (2013.01); *H04L 9/3268* (2013.01); *H04L 63/0823* (2013.01)

(58) Field of Classification Search
CPC .. H04L 9/3263; H04L 63/0823; H04L 9/3268
See application file for complete search history.

(56) References Cited

U.S. PATENT DOCUMENTS

| | | | |
|---|---|---|---|
| 2005/0129239 A1* | 6/2005 | Farley | H04B 7/18502 380/270 |
| 2007/0028095 A1 | 2/2007 | Allen et al. | |
| 2008/0052517 A1* | 2/2008 | Anstey | H04L 63/10 713/176 |
| 2009/0138517 A1 | 5/2009 | McLain et al. | |
| 2009/0259841 A1* | 10/2009 | Laberteaux | H04L 63/0823 713/156 |
| 2011/0083011 A1* | 4/2011 | DiCrescenzo | H04L 9/006 713/158 |
| 2011/0213968 A1* | 9/2011 | Zhang | H04L 63/20 713/158 |
| 2013/0007854 A1* | 1/2013 | Sorenson, III | H04L 63/0823 726/5 |
| 2013/0036103 A1* | 2/2013 | Lawson | G06F 21/64 707/698 |

(Continued)

FOREIGN PATENT DOCUMENTS

EP 2012091 A1 1/2009

OTHER PUBLICATIONS

European Search Report for EP Appl. No. 16194004.4 dated Feb. 23, 2017.

(Continued)

*Primary Examiner* — Michael R Vaughan
(74) *Attorney, Agent, or Firm* — MH2 Technolology Law Group LLP

(57) ABSTRACT

The present invention generally relates to one or more line replacement units ("LRUs") for an airplane. The LRUs can include airline modifiable information ("AMI") that includes more than one public key certificates, wherein each of the more than one public key certificates uniquely identifies the airplane for ground communication based, at least in part, on a public key or a private key associated with the one or more public/private key pairs generated by a cryptographic key generator.

20 Claims, 7 Drawing Sheets

(56) References Cited

U.S. PATENT DOCUMENTS

| | | |
|---|---|---|
| 2013/0132548 A1 | 5/2013 | Cabos |
| 2014/0075186 A1* | 3/2014 | Austen .................. H04L 63/061 |
| | | 713/156 |
| 2016/0285864 A1* | 9/2016 | Canavor ............. H04L 63/0823 |
| 2017/0034700 A1* | 2/2017 | Cohen ................... H04W 12/06 |
| 2017/0111178 A1* | 4/2017 | Winkelvos ............ H04W 12/04 |
| 2017/0140175 A1* | 5/2017 | Angus ................... G06F 21/602 |

OTHER PUBLICATIONS

Olive, "Efficient Datalink Security in a Bandwidth-Limited Mobile Environment—An Overview of the Aeronautical Telecommunications Network (ATN) Security Concept", 20th DASC, IEEE, vol. 2, 2001, pp. 9E2-9E1.

Communication pursuant to Article 94(3) EPC dated Apr. 10, 2019 in corresponding European Application No. 16 194 004.4 (8 pages).

\* cited by examiner

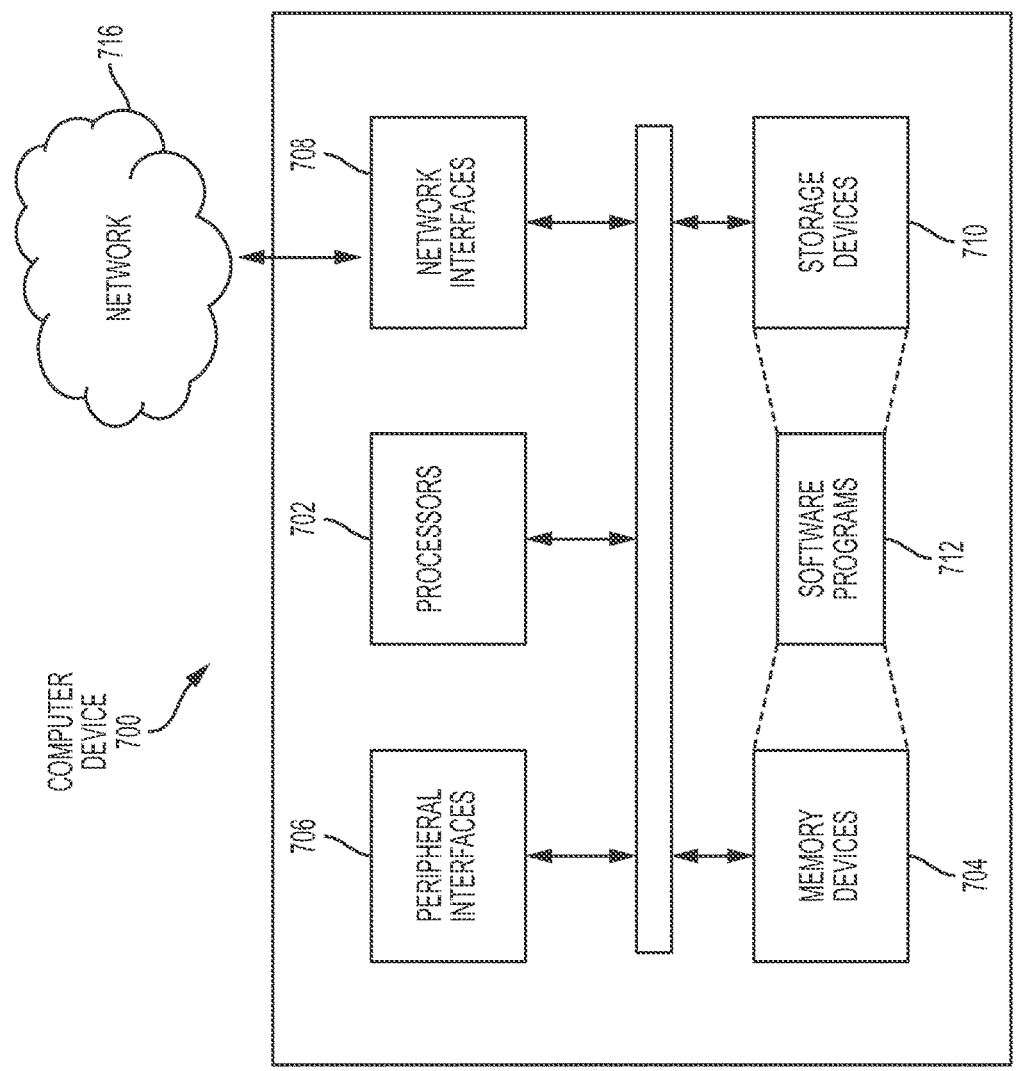

AIRPLANE IDENTITY MANAGEMENT WITH REDUNDANT LINE REPLACEABLE UNITS (LRUS) AND COMPOSITE AIRPLANE MODIFIABLE INFORMATION (AMI)

FIELD OF THE INVENTION

This invention relates generally to transmitting data to, from, or within an airplane in a secure manner.

BACKGROUND

The latest generation of airplane, such as the Boeing 787 and Airbus A350, include airplane data networks which introduce potential cyber security vulnerabilities. Cyber security vulnerabilities are not a new concept, however they are new in regards to airworthiness. This network provides connectivity between airplane and ground systems for transferring data to and from the airplane as well as connectivity to maintenance ground support equipment. An Airplane Network Security Program is required to safeguard this datalink.

Legacy airplane design involved the use of data busses such as ARINC 429/629 or MIL-STD-1553. Latest airplane designs can use, among other things, non-aviation standard TCP/IP to convey a wide variety of digital information including, but not limited to, passenger information and entertainment systems. Experience has shown that this type of technology is prone to a wide variety of attacks. Unless properly managed, any networked aviation system, if successfully attacked, can affect airplane software configuration. Operators must follow the instructions regarding information network security recommended by type certificate holders, supplementary type certificate holders, CASA regulations and policy in order to remain airworthy. Loadable Software Parts or Field Loadable Software are types of software applications used to alter airplane software configuration. It is important to regard software with the same airworthiness intent as physical based parts. Loadable software parts will require authorized release certificates. The handling of these software based parts requires the understanding of some unique concepts. Changes in software applications change the airplane software configuration.

"e-Enabled" airplane are composed of highly integrated interconnected software and firmware driven computer systems with specific real-time computing and control tasks. TCP/IP data links in-flight and on-ground transfer and receive critical control, navigation, operations and maintenance information. While bringing a higher level of efficiency to flight and business operations, they also bring safety implications, risks and requirements.

E-Enabled (or e-enabled) airplane have the capability to reprogram flight critical avionics components wirelessly and via various data transfer mechanisms. This capability alone, or coupled with passenger connectivity on the e-Enabled airplane network, may result in cyber security vulnerabilities from intentional or unintentional corruption of data and/or systems critical to the safety and continued airworthiness of the airplane.

Electrical systems of airplane and other specialized vehicles typically include line-replaceable units ("LRUs" or "LRU"). LRUs are modular electronics systems, which perform various vehicle operations. LRUs generally have, among other things, input and output electrical connections and an internal bus, typically a serial bus.

Airplane LRUs may be categorized according to how critical they are to the airplane operation, i.e., categorized according to criticality. The least critical LRUs are responsible for operations such as passenger in-flight entertainment, while the most critical LRUs are responsible for airplane airworthiness, e.g., flight controls. For example, the Airplane Control Domain (ACD) LRU is a most-critical LRU, the Aviation Information Systems (AIS) LRU is a middle-critical LRU, and the In-Flight Entertainment (AIF) LRU is a least-critical LRU.

Modern airplane are extremely complex. For example, an airplane may have many types of electronic systems on board. An electronic system on an airplane may be a LRU. A LRU is designed to be easily replaceable. A line-replaceable unit may be replaced when the airplane is in flight or while the airplane is on the ground.

LRUs may take on various forms. A LRU on an airplane may be, for example, without limitation, a flight management system, an autopilot, an in-flight entertainment system, a communications system, a navigation system, a flight controller, a flight recorder, a collision avoidance system, a system to support maintenance functions, or a system to support crew processes. The various LRUs on an airplane may be parts of an airplane network data processing system.

LRUs may use software or programming to provide the logic or control for various operations and functions. Typically, software on an airplane is treated as one or more separate parts or is combined with a hardware part and is unchangeable without changing the hardware part number. Airplane software that is treated as an airplane part may be referred to as a loadable airplane software part or an airplane software part. Airplane software parts are parts of the configuration of an airplane.

Current e-enabled airplane have a process whereby an airplane generates a private key on board which is matched to a digital certificate to give the plane a cryptographic identity. When this process is extended to airplane that has a high availability design the naïve approaches, which include key (identity) replication, essentially enable us to violate some original security requirement in order to retain availability of off board communications. In particular redundancy enables, if not encourages, one to accidentally (or intentionally) continue to use a identity keys that are open to compromise since a key that is still in use can be extracted from the LRU via forensics analysis.

SUMMARY

According to various embodiments, a line replacement unit ("LRU") for an airplane is provided that can comprise an airline modifiable information ("AMI") comprising more than one public key certificates, wherein each of the more than one public key certificates uniquely identifies the airplane for ground communication based, at least in part, on a public key associated with the one or more public/private key pairs generated by a cryptographic key generator.

Various optional features of the above embodiments include the following. The LRU can further comprise the cryptographic key generator operable to generate the one or more public/private key pairs and a memory operable to store the one or more public/private key pairs.

According to various embodiments, an airplane is provided that can comprise a first line replacement unit ("LRU") and a second LRU, wherein the first LRU and the second LRU comprise an airline modifiable information ("AMI") comprising a first public key certificate, wherein the first public key certificate provides a first unique identity for the airplane for ground communication based, at least in part, on a first public key associated with a first public/ private key pair generated by a first cryptographic key generator; and a second public key certificate, wherein the second public key certificate provides a second unique identity for the airplane for ground communication based, at least in part, on a second public key associated with a second public/private key pair generated by a second cryptographic key generator.

Various optional features of the above embodiments include the following. The first LRU can further comprises the first cryptographic key generator operable to generate the first public/private key pair and a first memory operable to store the first public/private key pair. The second LRU can further comprise the second cryptographic key generator operable to generate the second public/private key pair and a second memory operable to store the second public/private key pair. The first LRU can be configured to identify which one or more identity certificates the second LRU is using and the second LRU is configured to identity which one or more identity certificates the first LRU is using. The first LRU, the second LRU, or both the first LRU or second LRU can be operable to generate one or more certificate revocation requests based, at least in part, on the first LRU operable to identify which one or more identity certificates the second LRU is using and the second LRU configured to identity which one or more identity certificates the first LRU is using.

According to various embodiments, a method for provisioning a second line replacement unit ("LRU") using a first LRU in an airplane is provided. The method can comprise providing, by the first LRU, a communication to the second LRU to request a certificate signing request ("CSR") based on a public-private key pair generated by the second LRU; obtaining the CSR from the first LRU; providing the CSR and a certificate revocation request for a replaced LRU to a certificate authority ("CA"); obtaining a composite airline modifiable information ("AMI") comprising a public key certificate associated with a private key generated by the first LRU; and providing the composite AMI to the first LRU.

Various optional features of the above embodiments include the following. The composite AMI can comprise additional certificates that uniquely identifies other airplanes or other LRUs for the same airplane. The composite AMI can comprise additional certificates that provide a secondary identify for the airplane. The public key certificate can be a X.509 certificate.

According to various embodiments, a method for determining a correct public key infrastructure ("PKI") certificate for a line replacement unit ("LRU") stored on airline modifiable information ("AMI") of an airplane is provided. The method can comprise obtaining one or more PKI certificates from the AMI; determining, by the LRU, that a private key or a public key stored on the LRU is associated with a public key stored in a PKI certificate of the one or more PKI certificates; and using the PKI certificate to uniquely identify the airplane for communication.

Various optional features of the above embodiments include the following. The one or more of the one or more PKI certificates can be associated with another LRU. The another LRU can be associated with another airplane. The determining can further comprise matching the public key stored on the LRU with the public key stored in the PKI certificate.

According to various embodiments, a computer-readable medium computer-interpretable instructions which, when executed by at least one electronic processor, cause the at least one electronic processor to perform a method of determining a correct public key infrastructure ("PKI") certificate for a line replacement unit ("LRU") (205) stored on airline modifiable information ("AMI") (210) of an airplane (105) is provided. The method can comprise obtaining one or more PKI certificates from the AMI (210); determining, by the LRU (205), that a private key or a public key stored on the LRU (205) is associated with a public key stored in a PKI certificate of the one or more PKI certificates; and using the PKI certificate to uniquely identify the airplane (105) for communication.

According to various examples of the present disclosure, a method for identifying an airplane for ground communication is provided. The method comprises generating one or more public/private key pairs by a cryptographic key generator of an airline modifiable information ("AMI") of a line replaceable unit ("LRU") on the airplane; generating a certificate signing request ("CSR") for a public/private key pair of the one or more public/private key pairs; providing the CSR to a trusted third party; and obtaining a public key certificates that uniquely identifies the airplane for ground communication. In some examples, the method can further comprise storing the public key certificate in a first computer-readable medium. In some examples, the method can further comprise storing the one or more public/private key pairs in a second computer-readable medium. In some examples, the trusted third party is a certificate authority. In some examples, the method can further comprise generating additional CSR for remaining public/private key pair of the one or more public/private key pairs; providing the additional CSR to the trusted third party; and obtaining additional public key certificates that uniquely identifies the airplane for ground communication, wherein each additional public key certificate is associated with one public key of the one or more public/private key pairs. In some examples, the method can further comprise identifying which public key certificate is in use from among the additional public key certificates. In some examples, the method can further comprise generating one or more certificate revocation requests based, at least in part, on the LRU identifying which public key certificate is in use; and providing the one or more certificate revocation requests to the trusted third party.

BRIEF DESCRIPTION OF THE DRAWINGS

Various features of the embodiments can be more fully appreciated, as the embodiments become better understood with reference to the following detailed description, when considered in connection with the accompanying figures, in which:

FIG. 7 shows an example computer system according to embodiments.

DESCRIPTION OF EMBODIMENTS

Figure 1:
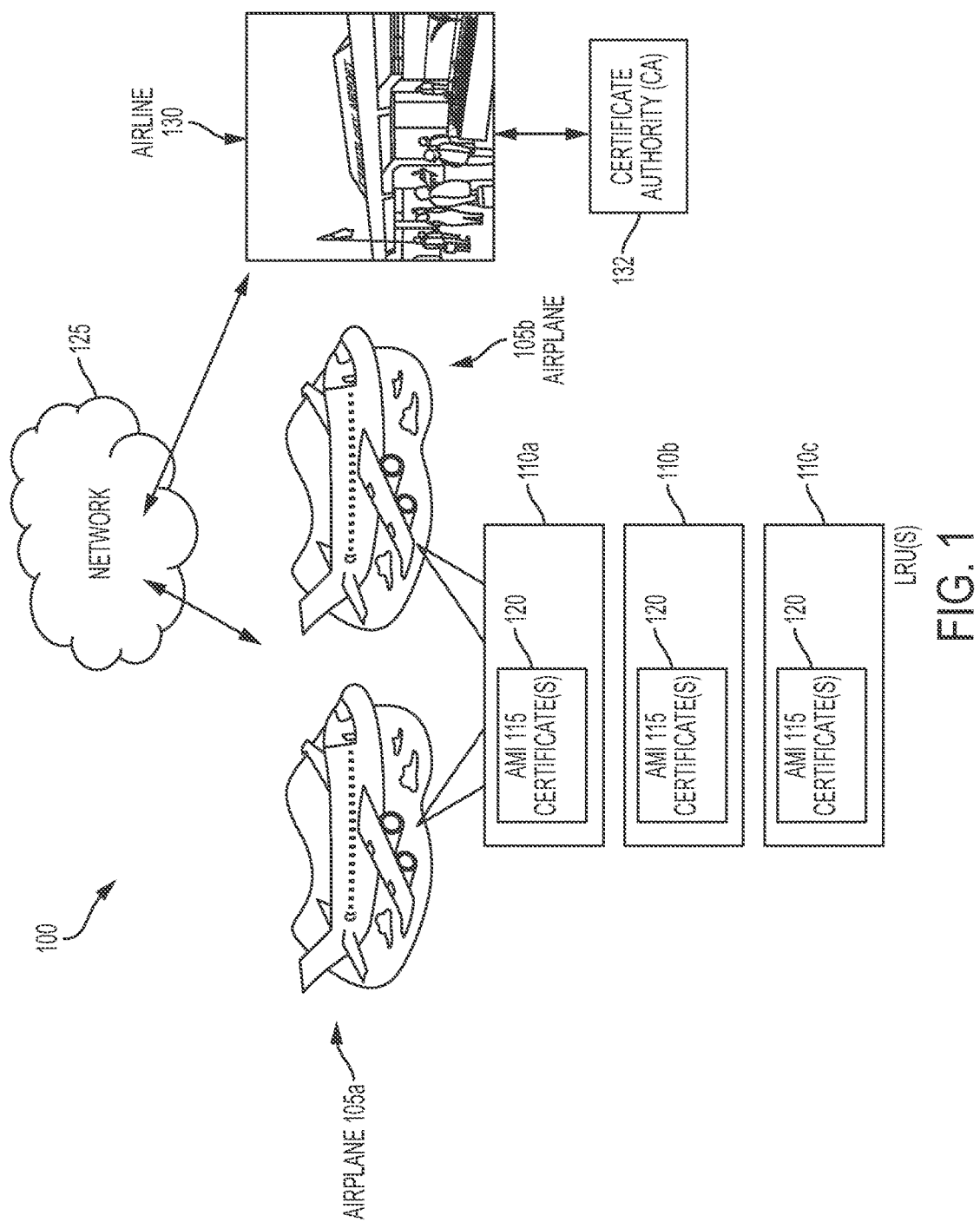
FIG. 1 is an illustration of a block diagram of an airplane maintenance environment according to some embodiments.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Communications to and from an airplane, as well as communications within an airplane, present gaps in aviation cyber security. Some embodiments improve the security of such communications by providing a software solution that does not require the installation of additional hardware in the airplane. This keeps the overall cost low, because the solution can be offered as a software upgrade to work with existing hardware. Note that adding hardware to an in-service airplane generally requires a costly and time-consuming Federal Aviation Administration (FAA) recertification. Consequently, some embodiments provide airplane currently in service with the ability to greatly improve their communication security posture, without the overhead of an FAA recertification. Some embodiments are thus appealing to airlines and other airplane providers.

Each airplane has a unique identify for digital communication based on pubic key cryptography. For airplane communicating with the ground systems, the airplane identities itself to the ground systems using a certificate that the ground trusts. Today public/private key pairs can exist on one or more systems, such as the LRU, in the airplane. If only one LRU has the key pair and the LRU fails and for security best practices to be maintained, it is assumed that control of the private key has been lost. In this case, a new key pair would be generated and a new certificate reissued and loaded since there is no backup copy of the private key. If private key from replaced LRU were to be recovered, then whoever has the private key can masquerade as an airplane in the network. Ideally the certificate should be revoked as soon as possible after the maintenance action that removes the failed LRU occurs. During this rekeying process, communication between the airplane and ground infrastructure will fail since the ground infrastructure will not be able to authenticate the identity of the airplane.

Generally speaking, the present disclosure provides an approach that maintains and enforces security best practices with respect to private keys, follows the flow of the existing airplane public key infrastructure ("PKI") maintenance processes, and enables continuous availability of authenticated communication pathways. As an additional benefit, the present approach makes it easier to consolidate the way airplane identities are managed as operational software across an airplane fleet; thereby, greatly reducing the number of parts that must be managed. For example, for a fleet of 100 planes the reduction could be effectively a 100 fold reduction in the number of airplane identity software parts that need to the managed.

Airplane operators are entities that operate airplane. Airplane operators also may be responsible for the maintenance and repair of airplane. Examples of airplane operators include airlines and military units. When an airplane operator receives an airplane, airplane software parts may already be installed in the line-replaceable units on the airplane.

An airplane operator may also receive copies of loaded airplane software parts in case the parts need to be reinstalled or reloaded into the line-replaceable units on the airplane. Reloading of airplane software parts may be required, for example, if a line-replaceable unit in which the software is used is replaced or repaired. Further, the airplane operator also may receive updates to the airplane software parts from time to time. These updates may include additional features not present in the currently-installed airplane software parts and may be considered upgrades to one or more line-replaceable units. Specified procedures may be followed during loading of an airplane software part on an airplane such that the current configuration of the airplane, including all of the airplane software parts loaded on the airplane, is known. As discussed further below, the private key is not included as a part of the loaded airplane software part. In this instance and again will be discussed below, the LRU creates a cryptographic key pair, create and provide a certificate signing request to a certificate authority or trusted third party based, at least in part, on the public key of the cryptographic key pair that was generated, and receive the certificate for the identify of the LRU (and as a result the airplane) based on the public key as part of a loadable software part, such as an airline modifiable information ("AMI").

An electronic system may take on various forms. An electronic system on an airplane may be, for example, without limitation, a flight management system, an autopilot, an in-flight entertainment system, a communications system, a navigation system, a flight controller, a flight recorder, and a collision avoidance system. The various electronic systems on an airplane may communicate with each other via digital airplane networks.

Data processing networks may employ digital certificates in a public key infrastructure to ensure that only approved software and other data are used on the network. Such digital certificates also may be known as public key certificates or identity certificates. The digital certificates are issued by a certificate authority that is trusted by the network. The digital certificate identifies the source of the software or other data to the network in a manner that can be trusted. The network may use the digital certificate to determine whether or not the software or other data will be used on the network.

Turning now to FIG. 1, an illustration of a block diagram of an airplane maintenance environment is depicted in accordance with an illustrative embodiment. In this example, airplane maintenance environment 100 may be configured for the maintenance of one or more airplane. The one or more airplane 105*a* and 105*b* may be managed as a fleet of airplane by airline 130. Each of the one or more airplane 105*a*, 105*b* can include one or more LRUs, such as LRU 110*a*, 110*b*, 110*c*, where each can be loaded with one or more AMIs, such as AMI 115. By way of a non-limiting example of a fleet management scenario, the same AMI can be loaded onto a corresponding same LRU for each airplane, such that the AMI is loaded onto the same LRU position on each airplane managed by the airline 130.

Airplane 105*a*, 105*b* may be any appropriate type of airplane. For example, without limitation, airplane 105*a*, 105*b* may be a commercial or private passenger airplane, a cargo airplane, a military or other government airplane, or any other airplane configured for any appropriate purpose or mission. Airplane 105*a*, 105*b* may be a fixed wing, rotary wing, or lighter than air airplane. Airplane 105*a*, 105*b* may be a manned airplane or an unmanned air vehicle.

Airplane 105*a*, 105*b* is one example of a platform in which an illustrative embodiment may be implemented. The platform may be a vehicle or other mobile structure. For example, without limitation, the platform may be an aerospace vehicle that is capable of traveling through the air, in space, or both. As another example, without limitation, the platform may be a vehicle that is capable of traveling on land, on the surface of water, underwater, or in any other medium or combination of media. In another illustrative embodiment, the platform may be a static system. For example, without limitation, the platform may be an industrial control system or other generally non-mobile system.

Airplane 105a, 105b may use data for operation of airplane 105a, 105b. For example, data may include software, other data, or various combinations of data. For example, without limitation, software may include airplane software parts for use on line-replaceable units 110a, 110b, 110c on airplane 105a, 105b. For example, without limitation, other data may include mapping data or other data or combinations of data for use by airplane 105a, 105b.

The data may be used by number of systems on airplane 105a, 105b. For example, without limitation, the number of systems may include automatic pilot, flight management, communications, health management, other systems, or various combinations of systems for performing various functions on airplane 105a, 105b.

The data may be provided by a data provider, such as airline 130. Data provider may be any entity that has authority to provide data for use on airplane 105a, 105b or to load data on airplane 105a, 105b. For example, without limitation, data provider may include a software supplier, an airplane maintenance entity, an airplane operator, an airplane manufacturer, or any other entity or combination of entities authorized to provide data for use on airplane 105a, 105b. Data provider may be any entity or combination of entities that is responsible for maintaining airplane 105a, 105b. Data provider may or may not be the owner of airplane 105a, 105b. Data provider may include a entity acting on behalf of the owner of airplane 105a, 105b to provide data for use on airplane 105a, 105b. Data provider, such as airline 130, may include or be associated with certificate authority ("CA") 132 associated with the airline or another trusted third party, which can provide the functionality of a CA, such as receiving requests for, issuing of, or revoking digital certificates.

Data provider may provide data in data bundle for loading on airplane 105a, 105b over network 125. For example, data bundle may include data along with one or more digital certificates 120 provided in airline modifiable information ("AMI") 115. In some examples, the one or more digital certificates 120 may be from one or more certificate authorities.

The illustration of FIG. 1 is not meant to imply physical or architectural limitations to the manner in which different illustrative embodiments may be implemented. Other components in addition to, in place of, or both in addition to and in place of the ones illustrated may be used.

Figure 2:
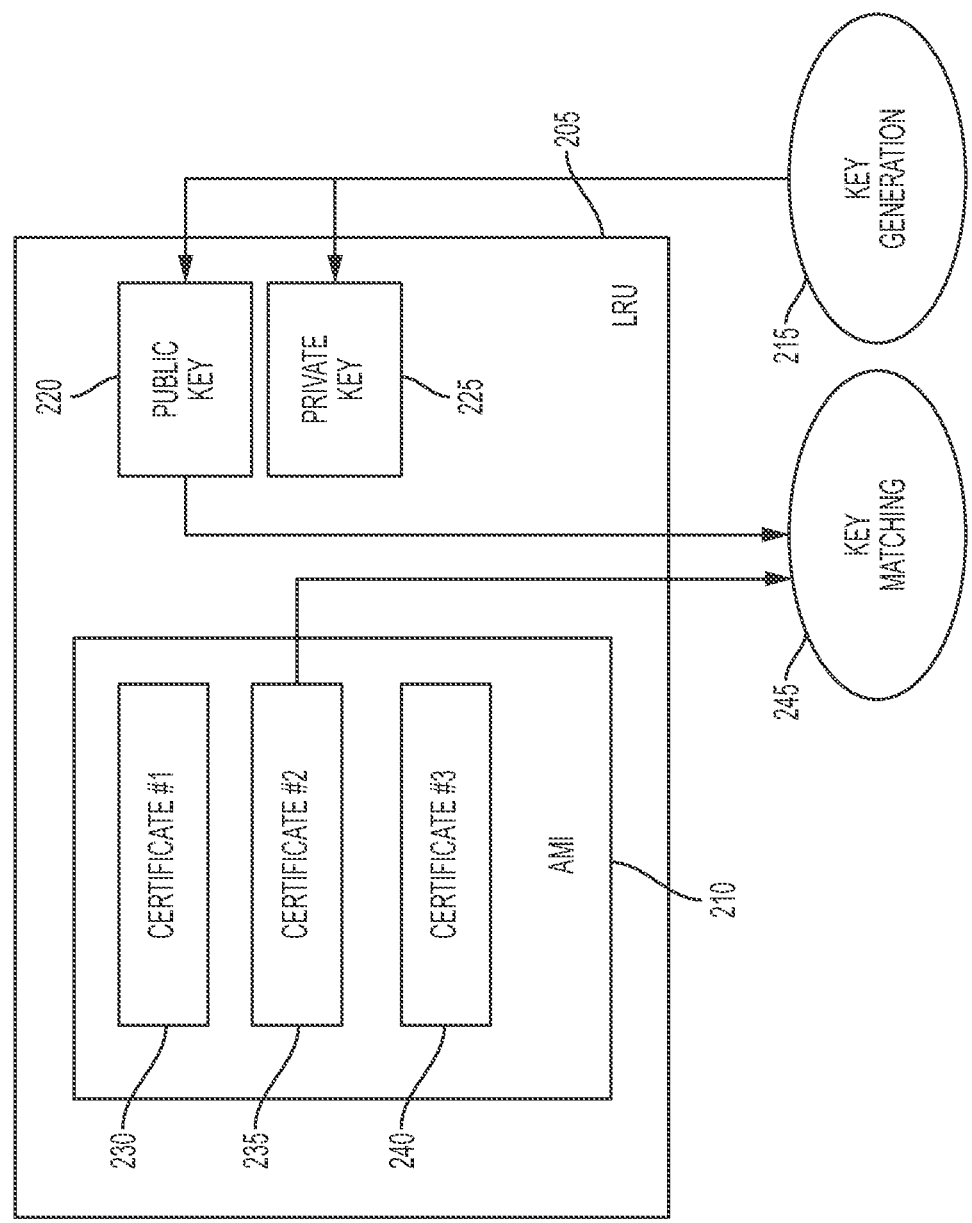
FIG. 2 shows a composite onboard authentication services ("OAS") AMI according to some embodiments.

FIG. 2 shows a composite onboard authentication services ("OAS") AMI 200 according the present teachings. The OAS provides a framework for authentication of various parties, such as airplane 105a, 105b, airline 130, or ground infrastructure including network 125, etc. Airplane 105a, 105b can have one or more LRUs 110a, 110b, 110c (of FIG. 1) or 205 (of FIG. 2). Each LRU 205 of the one or more LRUs 205 can include an AMI 210. In some implementations, each LRU 205 can generate a cryptographic key pair using a key pair generator 215, which can be based, at least in part, on a software, hardware, or both software and hardware source. In some implementations and as depicted in FIG. 2, the key pair can be generated by key pair generator 215 outside of the LRU 205. In either instance, the public key of the key pair can be stored in a public key store 220 and the private key of the key pair can be stored in private key store 225. In some instances, the public key store 220 and the private key store 225 is in a common memory structure, which can be logically divided, or in different memory structures. AMI 205 can store one or more certificates 230, 235, 240 (also called identity certificates or PKI certificates), such as X.509 PKI certificate, as configuration data. Each certificate 215, 220, 225 can include identifying information for airplane 105, such as a tail number or other information that uniquely identifies airplane 105. Each private key stored in the LRU 205 can represent a different airplane identity with which an airplane can communicate with the ground infrastructure using the associated certificate that was provisioned in AMI 210. The ability to allow an airplane to have different identities that are represented by different private keys allows the airplane some redundancy in communication in case of a compromise in or replacement of an LRU that can lead to a potentially unsecured private key. Airplane 105 can use different certificates based on different private keys in different scenarios. As discussed further below in FIG. 5, the certificates in the AMI 210 can be matched with a public and/or private key through a key matching operation 245. For example, each certificate, such as certificate #1 230, certificate #2 235, and certificate #3 240, in turn can be compared with either a public key or private key to determine if the public key or private key is associated with that certificate. For the public key case, the certificate itself will contain the public key for which the certificate was issued and the key matching 245 can compare the public key stored in public key store 220 with each public key in each of the certificates. When the LRU 205 identifies the certificate matching the public key stored in public key store 220, the LRU 205 will use that matching certificate for communication with the airline 130, CA 132, or other ground infrastructure entities.

In some instances, AMI 210 can store certificates for multiple airplanes, which can simplify the creation of AMI 210. In this case, a single AMI can be created for a fleet of airplanes owned by a particular airline. This AMI can be loaded onto each airplane, and the airplane, by a unique private key stored on the LRU, can be used to determine which certificate is associated with that unique private key. Once the correct certificate(s) are identified, the airplane can then use that certificate(s) in communication with the ground infrastructure for authentication.

Figure 3:
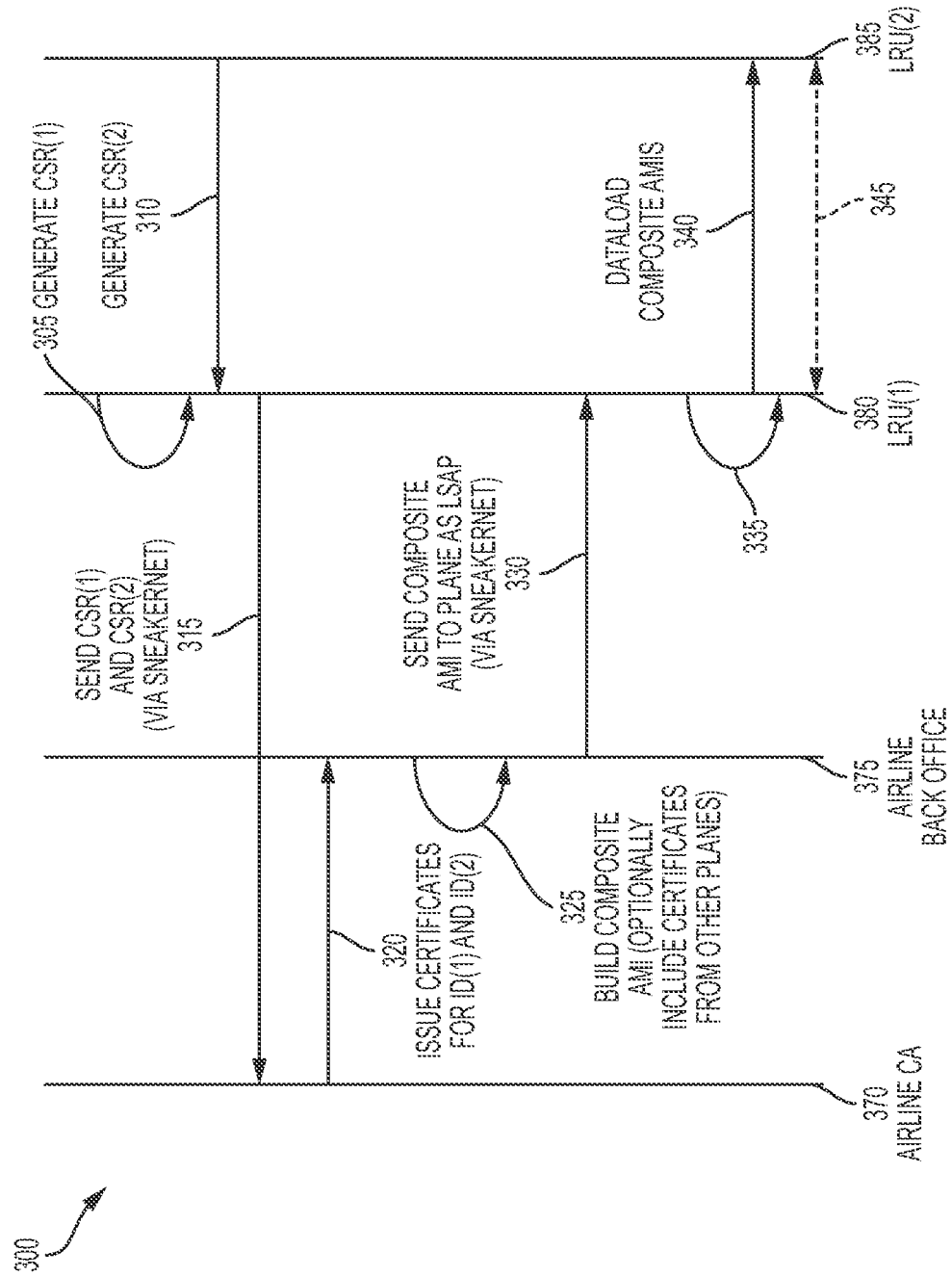
FIG. 3 shows an example construction process 300 for the AMI according to some embodiments.
Figure 4:
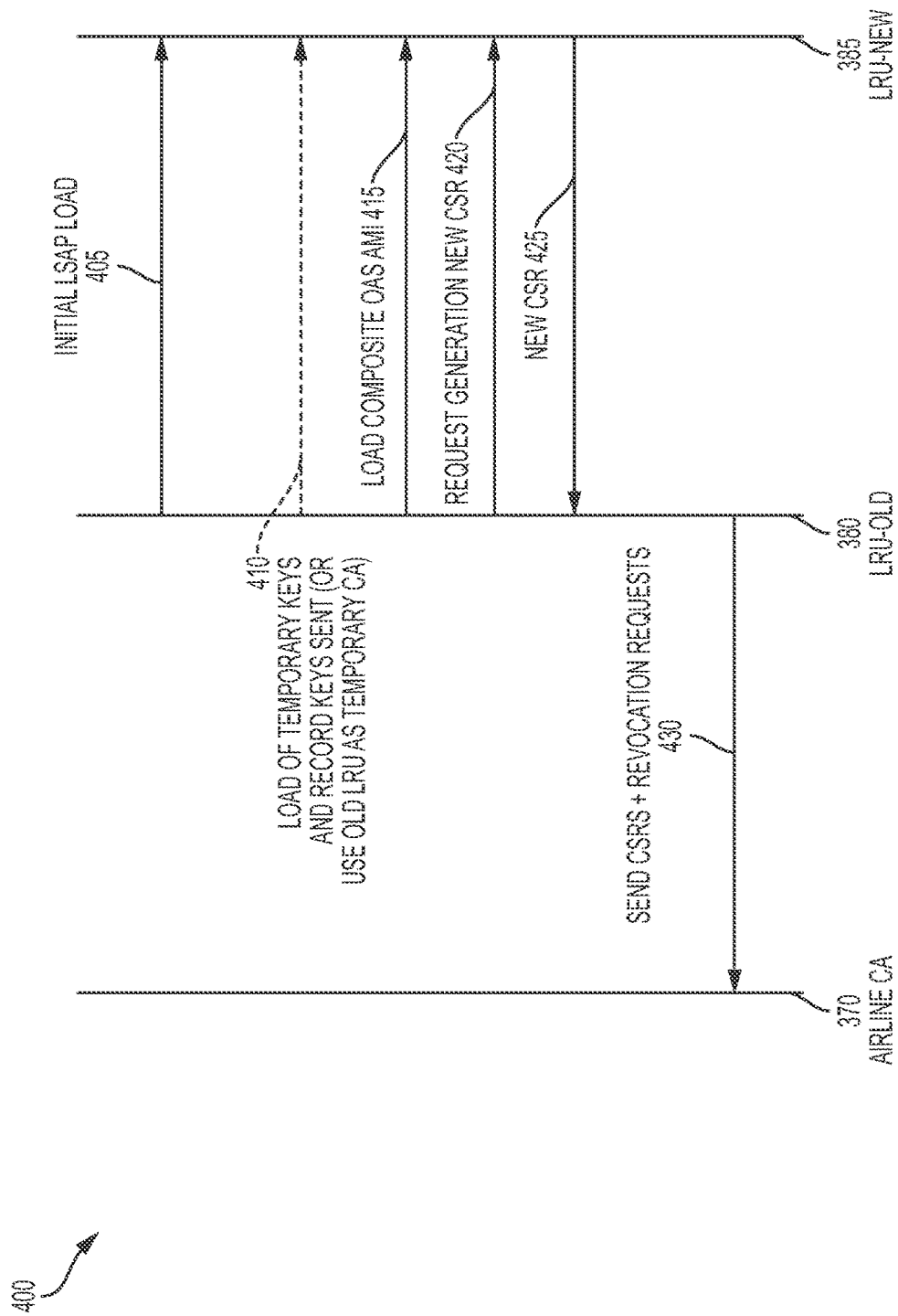
FIG. 4 shows an example LRU replacement dataload process 400 according to some embodiments.
Figure 6:
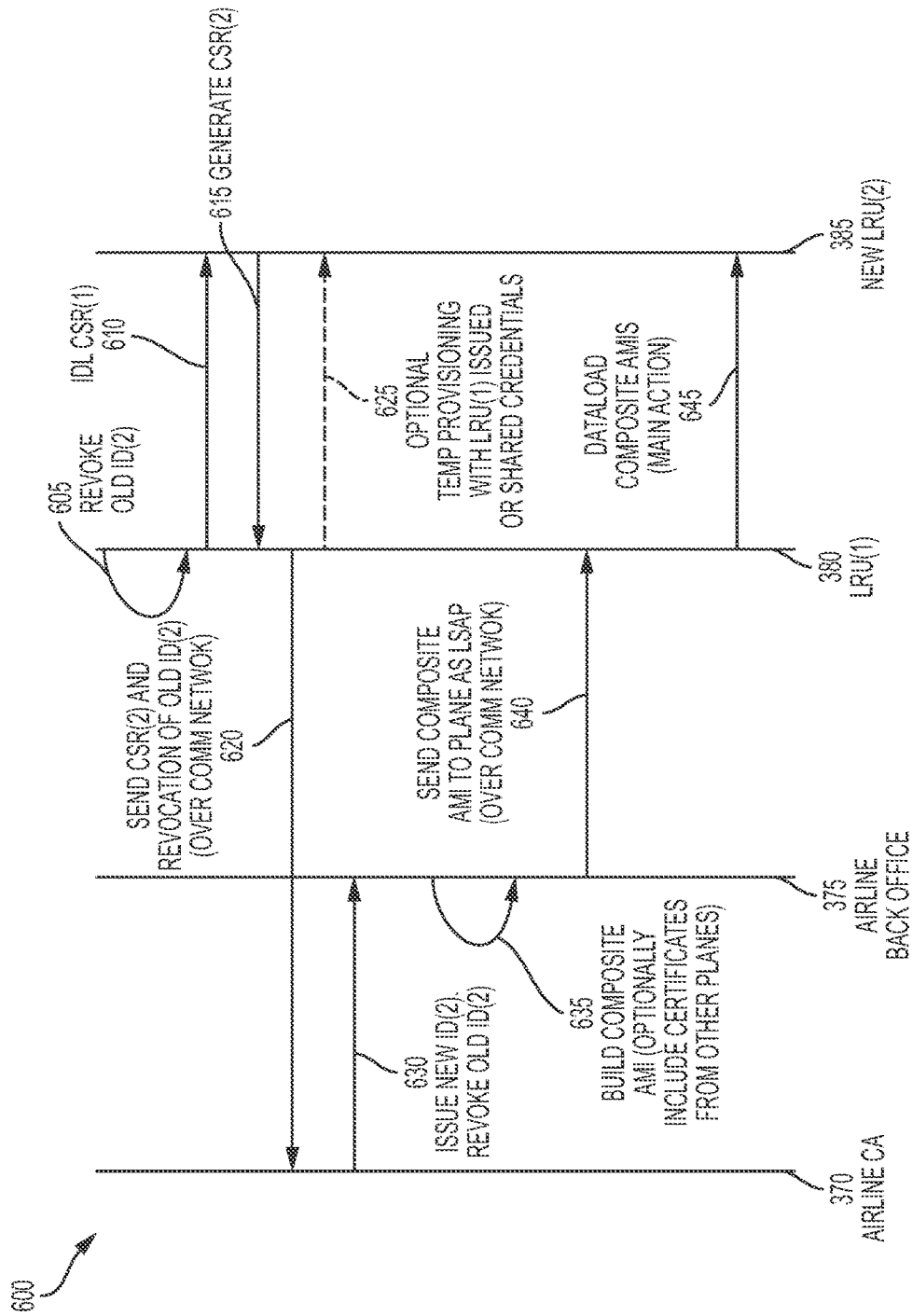
FIG. 6 shows an example LRU replacement process according to some embodiments.

As discussed above, an airplane can have one or more LRUs. In the case where multiple LRUs are used, the airplane can have an authentication backup in case one of the LRUs fails. The present disclosure is not limited by the number of LRUs. In the case of AMI generation, as depicted in FIG. 3, two LRUs are described, where one of the LRUs can be the primary LRU and the other LRU can be secondary or back-up LRU. In the case of a replacement of an LRU, as depicted in FIGS. 4 and 6, the following labeling is used. The old LRU (also called the first LRU) is the LRU that remains and the new LRU (also called the second LRU) is the LRU that is being installed to replace the replaced LRU (also called the third). The replaced or third LRU is the LRU that has either failed or is being replaced for another reason.

FIG. 3 shows an example construction process 300 for the AMI, according to aspects consistent with the present teachings. At 305, LRU 1 380 generates one or more first certificate signing request ("CSR"), which each certificate signing request corresponds to one key pair. At 310, LRU 2

385 generates one or more second CSRs and sends the one or more second CSRs to the LRU 1 380. At 315, LRU 1 380 sends both the one or more first and the one or more second CSRs to airline CA 370. At 320, airline CA 370 generates one or more certificates for each public key in the one or more CSRS, which are public key infrastructure ("PKI") or X.509 digital certificates (also called "identity certificates" that are used by the LRU, and hence the airplane on which the LRU resides, to identify the airplane to the airline 130, CA 132, airline CA 370, airline back office 375, or other ground infrastructure entitles) and issues those identity certificates for LRU 1 380 (ID1) and LRU 2 385 (ID2) and sends the identity certificates to airline back office 375. At 325, airline back office 375 builds the composite AMI and optionally includes certificates that were previously issued from other planes. At 330, airline back office 375 sends the composite AMI to LRU 1 380 and is loaded at 335. At 340, the LRU 1 380 sends, during an overlapping time period as 335 or at a different time interval, a data communication including the composite AMI to the LRU 2 385 to be loaded and executed. At 345, LRU 1 380 and LRU 2 385 can exchange information to identify which identities are active on each LRU, where a particular identify is based, at least in part, on a public/private key pair unique to that LRU. In some implementations, a particular LRU can have multiple identities based on multiple key pairs.

FIG. 4 shows an example LRU replacement dataload (load and execution) process 400, according to aspects consistent with the present teachings. In this example, replaced or third LRU (not shown) has been replaced with new or second LRU 2 385 and old or first LRU 1 380 is able to provision the new or second LRU 2 385. At 405, old or first LRU 1 380 sends an initial operational software load to new or second LRU 2 385. At 410, old LRU 1 380 can optionally send one or more temporary keys based on secondary key pars associated with the old or first LRU 1 380 and record those keys sent to new or second LRU 2 385. In this instance, the old or first LRU 1 380 can optionally function as a subordinate CA to airline CA 370 in its interaction with new or second LRU 2 385. In the instance that the old or first LRU 1 380 has multiple key pairs (and corresponding multiple identities, one for each key pair, where one key pair is designed as a primary key pair (corresponding to a primary identity) and one or more key pairs are designed as secondary key pairs (corresponding to one or more second identities), the old or first LRU 1 380 can send a separate CSR for each key pair to the airline CA 370 and have multiple certificates issued for each key pair associated with the old or first LRU 1 380. The old or first LRU 1 380 can then use one or more of the one or more secondary key pairs to provision the new or second LRU 2 385 as a backup option to maintain communication integrity if old or first LRU 1 380 fails. At 415, old or first LRU 1 380 sends a load composite OAS AMI to new or second LRU 2 385. At 420, old or first LRU 1 380 sends a request for generation of a new CSR to new or second LRU 2 385. At 425, new or second LRU 2 385 sends a new (one or more) CSR(s) to old or first LRU 1 380. At 430, old or first LRU 1 380 sends one or more CSRs and revocation request(s) to revoke one or more certificates for the one or more identities in use by the LRU (third LRU) that was replaced to airline CA 370.

Figure 5:
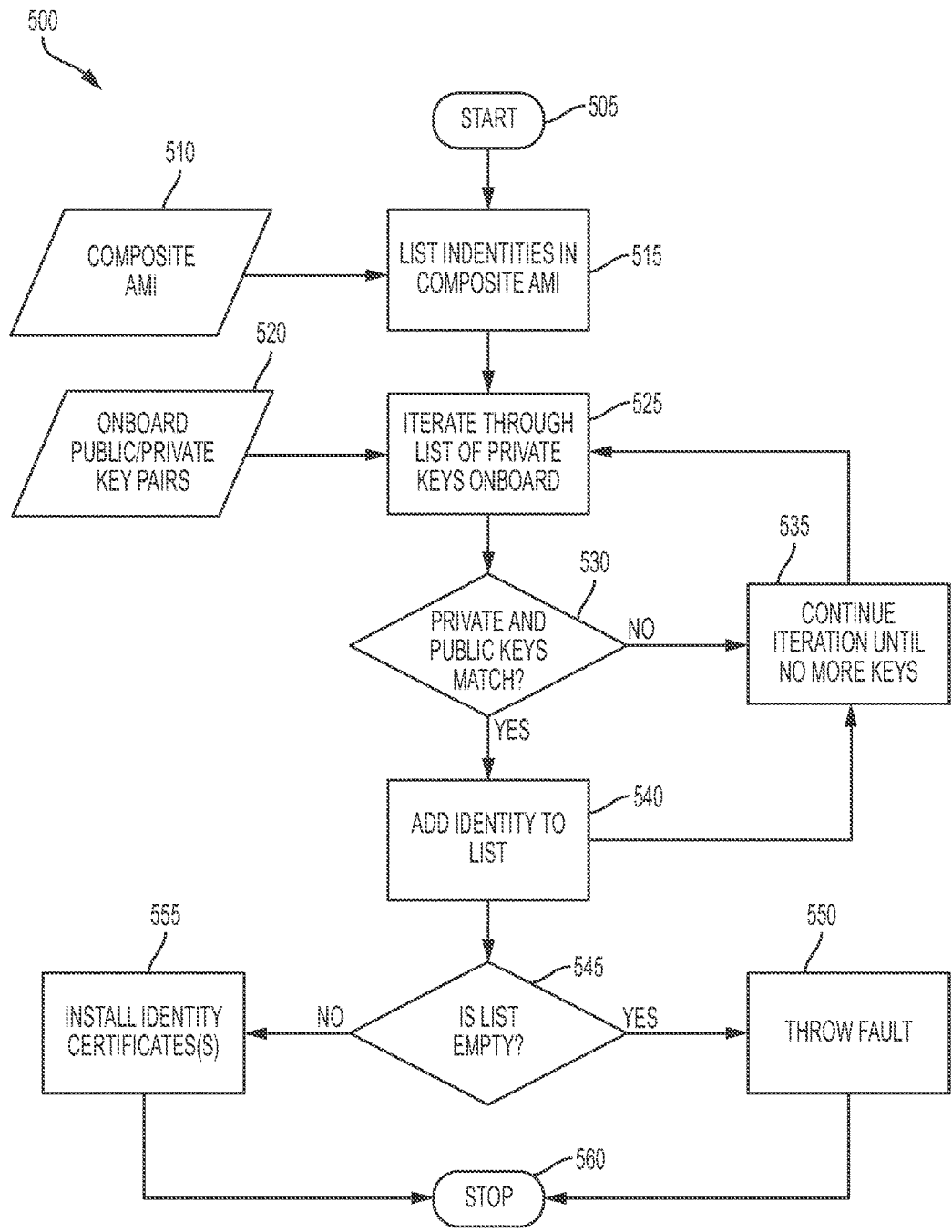
FIG. 5 shows an example identity selection and installation process according to some embodiments.

FIG. 5 shows an example identity selection and installation process 500, according to aspects consistent with the present teachings. The process begins at 505, and at 510, a composite AMI is provided that list identities of airplanes as certificates where at least one certificate is expected to match a private key stored within an LRU in composite AMI at 515. At 520, onboard public/private key pairs stored in the one or more LRUs are provided where an iteration process beings by examining the list of public and/or private key onboard at 525. At 530, a determination is made as to whether the private key matches the public key in the certificate. If the result of the determination is negative (the private key is not associated with the public key or the public keys do not match) at 530, the process continues to iterate until there are no more keys at 535 and loops back to 525. If the result of the determination is positive (the private key is associated with the public key or the public keys match) at 530, then the identity based on the certificate is added to a list to be used by the airplane for authentication with the ground infrastructure at 540 and continue to iterate until there are no more keys at 535. At 545, a determination is made as to whether the list is empty. If the result of the determination is negative (the list is empty) at 545, then a fault is caused at 550 and the process concludes at 560. If the result of the determination is positive (the list is not empty) at 545, then the identity certificate(s) are installed at 555 and the process concludes at 560.

FIG. 6 shows an example LRU replacement process 600, according to aspects consistent with the present teachings. In the LRU replacement process, old or first LRU 1 380 generates one or more certificate revocation requests for the one or more old identity certificate(s) (ID2) of the LRU (third LRU not shown) to be replaced at 605. At 610, old or first LRU 1 380 requests the new or second LRU 2 385 to generate one or more key pairs and receives one or more first CSRs from the new or second LRU 2 385. At 615, new or second LRU 2 385 generates and sends one or more second CSRs to old or first LRU 1 380. Each CSR of the one or more first and second CSRs is a request for a certificate for one public key of one or more key pairs. At 620, old or first LRU 1 380 sends the one or more second CSRs and revocation request of the one or more certificates of replaced (or third) LRU to airline CA 370 over a communication network. At 625, old or first LRU 1 380 can optionally sends a temporary provisioning message with old LRU issued or shared credentials to new or second LRU 2 385 as discussed above with reference to FIG. 4. At 630, airline CA 370 issues one or more new identify certificates ID2 for new or second LRU 2 385 and revokes one or more old identity certificates for the replaced (or third) LRU and sends this information to the airline back office 375. At 635, airline back office 375 builds the composite AMI and optionally includes one or more certificates from other airplanes, such as other airplanes managed by the airline 130. At 640, airline back office 375 sends the composite AMI(s) to old or first LRU 1 380 of the airplane as operational software over the communication network. At 645, old or first LRU 1 380 sends the composite AMI(s) to new or second LRU 2 385 to be loaded and executed.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

For example, FIG. 7 illustrates an example of a hardware configuration for a computer device 700, that can be used to perform one or more of the processes described above. While FIG. 7 illustrates various components contained in the computer device 700, FIG. 7 illustrates one example of a computer device and additional components can be added and existing components can be removed.

The computer device 700 can be any type of computer devices, such as desktops, laptops, servers, etc., or mobile devices, such as smart telephones, tablet computers, cellular telephones, personal digital assistants, etc. As illustrated in FIG. 7, the computer device 700 can include one or more processors 702 of varying core configurations and clock frequencies. The computer device 700 can also include one or more memory devices 704 that serve as a main memory during the operation of the computer device 700. For example, during operation, a copy of the software that supports the DNS operations can be stored in the one or more memory devices 704. The computer device 700 can also include one or more peripheral interfaces 706, such as keyboards, mice, touchpads, computer screens, touchscreens, etc., for enabling human interaction with and manipulation of the computer device 700.

The computer device 700 can also include one or more network interfaces 708 for communicating via one or more networks, such as Ethernet adapters, wireless transceivers, or serial network components, for communicating over wired or wireless media using protocols. The computer device 700 can also include one or more storage device 710 of varying physical dimensions and storage capacities, such as flash drives, hard drives, random access memory, etc., for storing data, such as images, files, and program instructions for execution by the one or more processors 702.

Additionally, the computer device 700 can include one or more software programs 712 that enable the functionality described above. The one or more software programs 712 can include instructions that cause the one or more processors 702 to perform the processes described herein. Copies of the one or more software programs 712 can be stored in the one or more memory devices 704 and/or on in the one or more storage devices 710. Likewise, the data, for example, DNS records, utilized by one or more software programs 712 can be stored in the one or more memory devices 704 and/or on in the one or more storage devices 710.

In implementations, the computer device 700 can communicate with other devices via a network 716. The other devices can be any types of devices as described above. The network 716 can be any type of network, such as a local area network, a wide-area network, a virtual private network, the Internet, an intranet, an extranet, a public switched telephone network, an infrared network, a wireless network, and any combination thereof. The network 716 can support communications using any of a variety of commercially-available protocols, such as TCP/IP, UDP, OSI, FTP, UPnP, NFS, CIFS, AppleTalk, and the like. The network 716 can be, for example, a local area network, a wide-area network, a virtual private network, the Internet, an intranet, an extranet, a public switched telephone network, an infrared network, a wireless network, and any combination thereof.

The computer device 700 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 700 as described above need not be enclosed within a single enclosure or even located in close proximity to one another. Those skilled in the art will appreciate that the above-described componentry are examples only, as the computer device 700 can include any type of hardware componentry, including any necessary accompanying firmware or software, for performing the disclosed implementations. The computer device 700 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A hardware line replacement unit ("LRU") for an airplane, comprising:
   an airline modifiable information ("AMI") comprising more than one public key certificates, wherein each of the more than one public key certificates provide a unique and separate identity for each airplane among a fleet of airplanes for ground communication, wherein a first public key certificate of the more than one public key certificates for the airplane is based, at least in part, on a public key associated with one or more public/private key pairs generated by a cryptographic key generator, wherein the public key is stored on the LRU and a second public key certificate of the more than one public key certificates is for another airplane among the fleet of airplanes,
   the cryptographic key generator operable to generate the one or more public/private key pairs; and
   a memory operable to store the one or more public/private key pairs.

2. The hardware LRU of claim 1, wherein each public key certificate of the more than one public key certificates is a X.509 certificate.

3. The hardware LRU of claim 1, wherein the AMI comprises additional certificates that provide a secondary identify for the airplane.

4. The hardware LRU of claim 1, wherein each public key certificate uniquely identifies other airplanes or other LRUs on a same airplane.

5. The hardware LRU of claim 1, wherein the LRU creates and provides a certificate signing request to a certificate authority or a trusted third party.

6. The hardware LRU of claim 5, wherein the certificate signing request is based on the public key.

7. The hardware LRU of claim 5, wherein the first public key certificate is received based on the certificate signing request.

8. The hardware LRU of claim 1, wherein a private key associated with the public key is not included in the AMI at a time of installation.

9. The hardware LRU of claim 1, wherein the LRU is part of a flight management system, a communication system, a navigation system, or a flight controller.

10. An airplane comprising:
    a first line replacement unit ("LRU");
    a second LRU,
    wherein the first LRU and the second LRU each comprise:
       an airline modifiable information ("AMI") comprising:
          a first public key certificate, wherein the first public key certificate provides a first unique identity for the airplane among a fleet of airplanes for ground communication based, at least in part, on a first public key associated with a first public/private key pair generated by a first cryptographic key generator, wherein the first public key is stored on the first LRU; and
          a second public key certificate, wherein the second public key certificate provides a second unique identity for another airplane among the fleet of airplanes for ground communication based, at least in part, on a second public key associated with a second public/private key pair generated by a second cryptographic key generator, wherein the second public key is stored on the second LRU.

11. The airplane of claim 10, wherein the first LRU further comprises:
    the first cryptographic key generator operable to generate the first public/private key pair; and
    a first memory operable to store the first public/private key pair.

12. The airplane of claim 11, wherein the second LRU further comprises:
    the second cryptographic key generator operable to generate the second public/private key pair; and
    a second memory operable to store the second public/private key pair.

13. The airplane of claim 10, wherein the first LRU is operable to identify which one or more identity certificates the second LRU is using and the second LRU is configured to identity which one or more identity certificates the first LRU is using.

14. The airplane of claim 13, wherein the first LRU, the second LRU, or both the first LRU or second LRU are operable to generate one or more certificate revocation requests based, at least in part, on the first LRU operable to identify which one or more identity certificates the second LRU is using and the second LRU configured to identity which one or more identity certificates the first LRU is using.

15. The airplane of claim 10, wherein each public key certificate is a X.509 certificate.

16. The airplane of claim 10, wherein the AMI comprises additional certificates that provide a secondary identify for the airplane.

17. The airplane of claim 10, wherein each public key certificate uniquely identifies other airplanes or other LRUs on a same airplane.

18. The airplane of claim 10, wherein the second LRU is provisioned using the first LRU that is configured to provide a communication to the second LRU to request a certificate signing request ("CSR") based on a public-private key pair generated by the second LRU, obtain the CSR from the first LRU, provide the CSR and a certificate revocation request for a replaced LRU to a trusted third party, obtain the AMI comprising more than one public key certificates associated with a unique private key generated by the first LRU, wherein each public key certificate provides a unique identify for each airplane among a fleet of airplanes for ground communication based, at least in part, on a public key associated with one or more public/private key pairs generated by a cryptographic key generator, wherein a first public key certificate of the more than one public key certificates for the airplane is based, at least in part, on a first public key stored on the first LRU and a second public key certificate of the more than one public key certificates is for another airplane among the fleet of airplanes and is based, at least in part, on a second public key that is stored on the first LRU, the cryptographic key generator operable to generate one or more public keys/private key pairs; and a memory operable to store the one or more public/private key pairs, and provide the AMI to the first LRU.

19. The airplane of claim 18, wherein trusted third party is a certificate authority.

20. The airplane of claim 10, wherein the first LRU, the second LRU, or both the first LRU and the second LRU are part of a flight management system, a communication system, a navigation system, or a flight controller.

* * * * *